(12) United States Patent
Penn

(10) Patent No.: US 8,967,652 B2
(45) Date of Patent: Mar. 3, 2015

(54) MANUALLY OPERATED WHEELCHAIR HAVING INTEGRATED DIFFERENTIAL TO ALLOW FULL RANGE OF MOTION UNDER ONE-HANDED OPERATION

(71) Applicant: Joshua Carmine Penn, Colts Neck, NJ (US)

(72) Inventor: Joshua Carmine Penn, Colts Neck, NJ (US)

(*) Notice: Subject to any disclaimer, the term of this patent is extended or adjusted under 35 U.S.C. 154(b) by 0 days.

(21) Appl. No.: 13/943,438

(22) Filed: Jul. 16, 2013

(65) Prior Publication Data
US 2015/0021875 A1 Jan. 22, 2015

(51) Int. Cl.
B62M 1/14 (2006.01)
A61G 5/02 (2006.01)
A61G 5/10 (2006.01)

(52) U.S. Cl.
CPC ........ *A61G 5/022* (2013.01); *B62M 1/14* (2013.01); *A61G 2005/1054* (2013.01)
USPC ................ 280/250.1; 280/242.1; 280/247; 280/249

(58) Field of Classification Search
CPC . A61G 2005/1054; A61G 5/022; B62M 1/14; B22B 11/00
USPC ................ 280/450.1, 242.1, 247, 249, 304.1
See application file for complete search history.

(56) References Cited

U.S. PATENT DOCUMENTS

| | | | |
|---|---|---|---|
| 3,563,568 A * | 2/1971 | Sasse et al. | ............. 280/230 |
| 5,362,081 A | 11/1994 | Beidler et al. | |
| 5,482,305 A | 1/1996 | Jeffries et al. | |
| 5,632,499 A | 5/1997 | Hutcherson et al. | |
| 5,762,154 A | 6/1998 | Hsu | |
| 5,826,897 A | 10/1998 | Beard | |
| 5,846,154 A | 12/1998 | Godin | |
| 6,247,716 B1 | 6/2001 | Sato et al. | |
| 6,346,061 B1 | 2/2002 | Olsson | |
| 7,959,176 B2 | 6/2011 | Bidwell et al. | |
| 2005/0016780 A1* | 1/2005 | Richey et al. | ........... 180/65.1 |
| 2005/0151334 A1* | 7/2005 | Flowers et al. | ............ 280/47.11 |
| 2009/0273156 A1 | 11/2009 | Byun | |

* cited by examiner

*Primary Examiner* — Joseph Rocca
*Assistant Examiner* — Marlon Arce

(57) ABSTRACT

A wheelchair includes a seat for supporting an occupant and a frame supporting the seat, where the frame further includes a first pair of wheels and a second pair of wheels connected by a differential for reversibly locking the second pair of wheels such that propulsion of only one of the wheels in the second pair of wheels results in both of wheels in the second pair of wheels moving in an identical direction.

18 Claims, 6 Drawing Sheets

MANUALLY OPERATED WHEELCHAIR HAVING INTEGRATED DIFFERENTIAL TO ALLOW FULL RANGE OF MOTION UNDER ONE-HANDED OPERATION

FIELD OF THE INVENTION

The present invention generally relates to medical equipment, and more specifically relates to manually operated wheelchairs.

BACKGROUND

Wheelchairs are used by people for whom walking is difficult or impossible due to illness (physiological or physical), injury, or disability. Conventional wheelchairs are propelled either by a motor or manually (e.g., by the seated occupant turning the rear wheels by hand).

A basic manually-operated wheelchair incorporates a seat, foot rests, and four wheels: two caster wheels at the front and two larger wheels at the back. The two rear wheels are used to propel the chair. Turning both of the rear wheels simultaneously in the same direction (e.g., by the seated occupant using both hands) propels the chair in a straight line, forward or backward. Turning only one of the wheels (e.g., by the seated occupant using only one hand) results in a pivot or circular propulsion of the wheelchair. It is typically not possible to propel a conventional manually-operated wheelchair in a straight line using only one hand.

Unfortunately, the seated occupant may not have easy use of both hands. For instance, certain illnesses or injuries (e.g., cancer, multiple sclerosis, amputation) may limit an individual's use of his or her hands and arms. This makes operation of a manually-operated wheelchair difficult, since both hands are typically needed in order to enjoy the full range of motion of the chair as discussed above.

SUMMARY OF THE INVENTION

A wheelchair includes a seat for supporting an occupant and a frame supporting the seat, where the frame further includes a first pair of wheels and a second pair of wheels connected by a differential for reversibly locking the second pair of wheels such that propulsion of only one of the wheels in the second pair of wheels results in both of the wheels in the second pair of wheels moving in an identical direction.

In another embodiment, a wheelchair includes a seat for supporting an occupant and a frame supporting the seat, where frame includes a pair of front wheels, the pair of front wheels including a first front wheel and a second front wheel, a pair of rear wheels, the pair of rear wheels including a first rear wheel and a second rear wheel, and a differential connecting the first rear wheel and the second rear wheel. The differential includes a first planet gear connected to the first rear wheel by a first axle, a second planet gear connected to the second rear wheel by a second axle, and a sun gear connected to the frame, where the sun gear is moveable in a vertical direction to selectively engage the first planet gear and the second planet gear such that propulsion of only one of the first rear wheel or the second rear wheel results in the pair of rear wheels moving in an identical direction.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention includes a manually-operated wheelchair having an integrated differential that allows a full range of motion under one-handed operation. The integrated differential can be selectively engaged by a seated occupant of the wheelchair and locks the rear wheels of the wheelchair such that manual propulsion of one of the rear wheels causes both rear wheels to move in the same direction. Thus, the wheelchair can be propelled in a straight line (e.g., forward or backward) by turning only one of the rear wheels once they have been locked. When the integrated differential is disengaged, the rear wheels are unlocked and can be operated in the conventional manner (e.g., wherein turning of only one rear wheel results in pivoting of the wheelchair).

Figure 1:
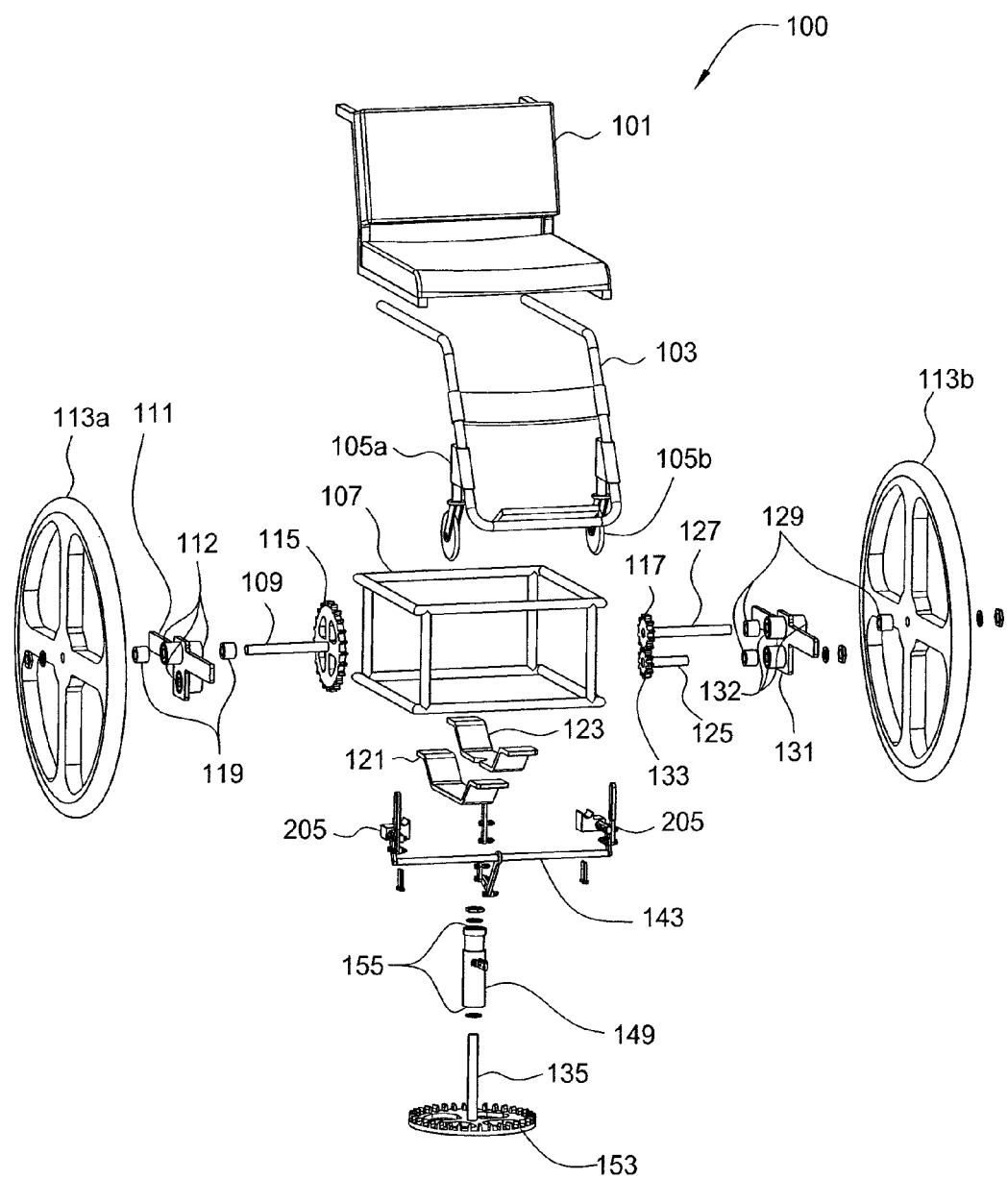
FIG. 1 is an exploded, perspective view of a wheelchair, according to embodiments of the present invention.

FIG. 1 is an exploded, perspective view of a wheelchair 100, according to embodiments of the present invention. For ease of explanation, FIG. 1 is somewhat simplified, and components that are known to those of skill in the art are not discussed in detail.

The wheelchair 100 generally comprises a seat 101, a frame 107, a first set of wheels ("front" wheels) 105a-105b, and a second set of wheels ("rear" wheels) 113a-113b. The seat 101 is configured to support a seated occupant of the wheelchair 100 and is mounted to the frame 107 (e.g., using screws and/or other fasteners). The first set of wheels 105a-105b is also mounted to the frame 107, for example via a leg support 103 that attaches to the frame 107. The leg support 103 may be configured to support the legs of the seated occupant. The second set of wheels 113a-113b is mounted to the frame 107 via a set of axels and a differential, as will be discussed in further detail below.

Whereas the first set of wheels 105a-105b is used largely to support the wheelchair 100, the second set of wheels 113a-113b is used to control the direction of propulsion of the wheelchair 100. The second set of wheels 113a-113b is thus larger in diameter than the first set of wheels 105a-105b and is positioned behind the first set of wheels 105a-105b. The wheels 105a and 105b are spaced apart from each other in a parallel manner, on opposite sides of the seat 101.

As discussed above, the second set of wheels 113a-113b is mounted to the frame 107 via a set of axels and a differential. In one particular embodiment, a first support bracket 111 is mounted to a first side of the frame 107. The first support bracket 111 includes an aperture through which a first axle 109 is inserted. The first support bracket 111 may further include a plurality of bearings 112 (e.g., press fitted ball bearings) that allow the first axle 109 to spin freely.

One of the wheels 113a from the second set of wheels 113a-113b is mounted to a first end of the first axle 109 (e.g., using washers, nuts, and/or other fasteners), such that the first support bracket 111 is positioned between the wheel 113a and the first axle 109. A gear 115 is mounted to a second end of the first axle 109 and functions as a first planet gear of the differential. One or more spacers 119 may be fitted onto the first axle 109 (e.g., such that one spacer 119 is positioned on either side of the first support bracket 111) in order to allow the first planet gear 115 to spin freely.

A second support bracket 131 is mounted to a second side of the frame 107, opposite the first support bracket 111. The second support bracket 131 includes two apertures through which a second axle 127 and a third axle 125 are respectively inserted. The second support bracket 131 may further include a plurality of bearings 132 (e.g., press fitted ball bearings) that allow the second axle 127 and the third axle 125 to spin freely.

The other wheel 113b in the second set of wheels 113a-113b is mounted to a first end of the second axle 127 (e.g., using washers, nuts, and/or other fasteners), such that the second support bracket 131 is positioned between the wheel 113b and the second axle 127. A gear 117 is mounted to a second end of the second axle 127 and functions as a second planet gear of the differential. A first end of the third axle 125 is mounted to the second support bracket 131. A gear 133 is mounted to a second end of the third axle 125 and function as a third planet gear of the differential. The third planet gear 133 engages the second planet gear 117, as illustrated. One or more spacers 129 may be fitted onto the second axle 127 and/or the third axle 125 (e.g., such that one spacer 129 is positioned on either side of the second support bracket 131) in order to allow the second planet gear 117 and the third planet gear 133 to spin freely.

As discussed above, the differential includes the first planet gear 115, the second planet gear 117, and the third planet gear 133. In addition, the differential includes a sun gear 153 that is positioned in a perpendicular manner relative to the first planet gear 115, the second planet gear 117, and the third planet gear 133. The sun gear 153 is mounted to a first end of a shaft 135. A second end of the shaft 135 is attached (e.g., using a washer, a nut, and/or other fasteners) to a sun gear lever (which is collectively comprised of at least one handle 205 coupled to an end of a connector 143), which in turn is mounted to the frame 107 (e.g., via a first frame bracket 121 and/or second frame bracket 123). The shaft 135 fits within a tubular support 149. Both ends of the tubular support 149 may include bearings 155 (e.g., press fitted ball bearings) to allow the shaft 135 to rotate freely within the tubular support 149. As discussed above, the sun gear lever includes at least one handle 205 coupled to a connector 143. The handle 205 allows the sun gear lever to be manually rotated such that the sun gear 153 selectively engages or disengages the first planet gear 115, the second planet gear 117, and the third planet gear 133. In one embodiment, one such handle 205 is positioned on either side of the wheelchair 100 (e.g., at opposite ends of the connector 143).

Figure 2:
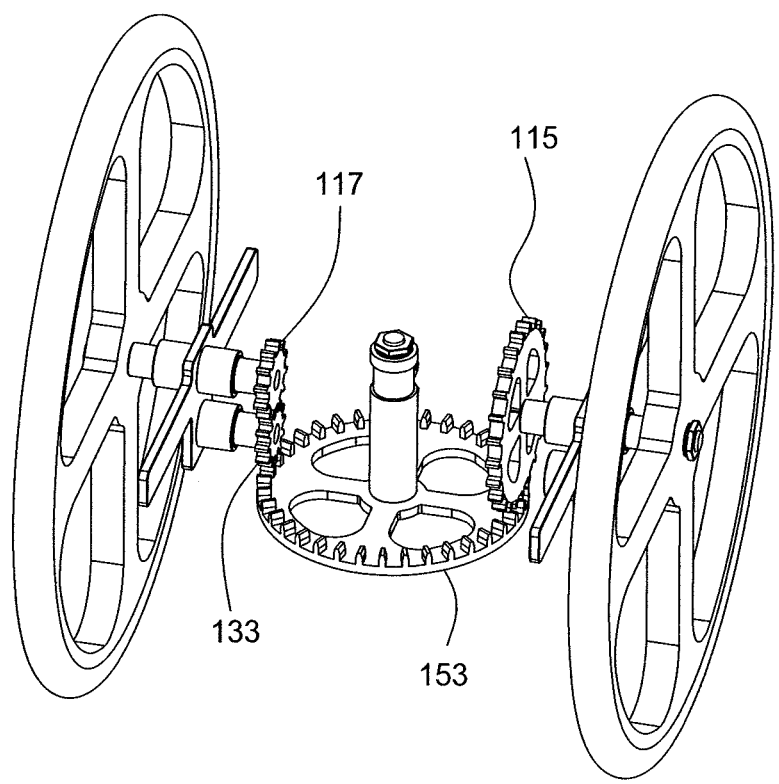
FIG. 2 is a perspective view illustrating the differential in the "locked" configuration.

When the sun gear 153 engages the first planet gear 115, the second planet gear 117, and the third planet gear 133, the differential is locked. FIG. 2, for example, is a perspective view illustrating the differential in the "locked" configuration. When the differential is locked, both of the wheels 113a and 113b in the second set of wheels are locked together, such that manual propulsion of one of the wheels 113a or 113b causes both rear wheels 113a and 113b to move in the same direction. Thus, the wheelchair 100 can be propelled in a straight line (e.g., forward or backward) by turning only one of the wheels 113a or 113b when the differential is locked.

Locking of the differential is reversible by rotating the sun gear lever such that the sun gear 153 is disengaged from the first planet gear 115, the second planet gear 117, and the third planet gear 133 (i.e., the differential is unlocked). In this case, both of the wheels 113a and 113b in the second set of wheels are free spinning and moveable independently of one another, such that manual propulsion of one of the wheels 113a or 113b causes the wheelchair 100 to be propelled in a circular motion.

It is further noted that due to the manner in which the axles 109, 127, and 125 are coupled to the respective wheels 113 of the wheelchair 100, the wheels 113 rotate with the axles 109, 127, and 125. This stands in contrast to conventional wheelchairs, in which the wheels and their axles typically rotate independently of each other (e.g., at different frequencies).

Figure 3:
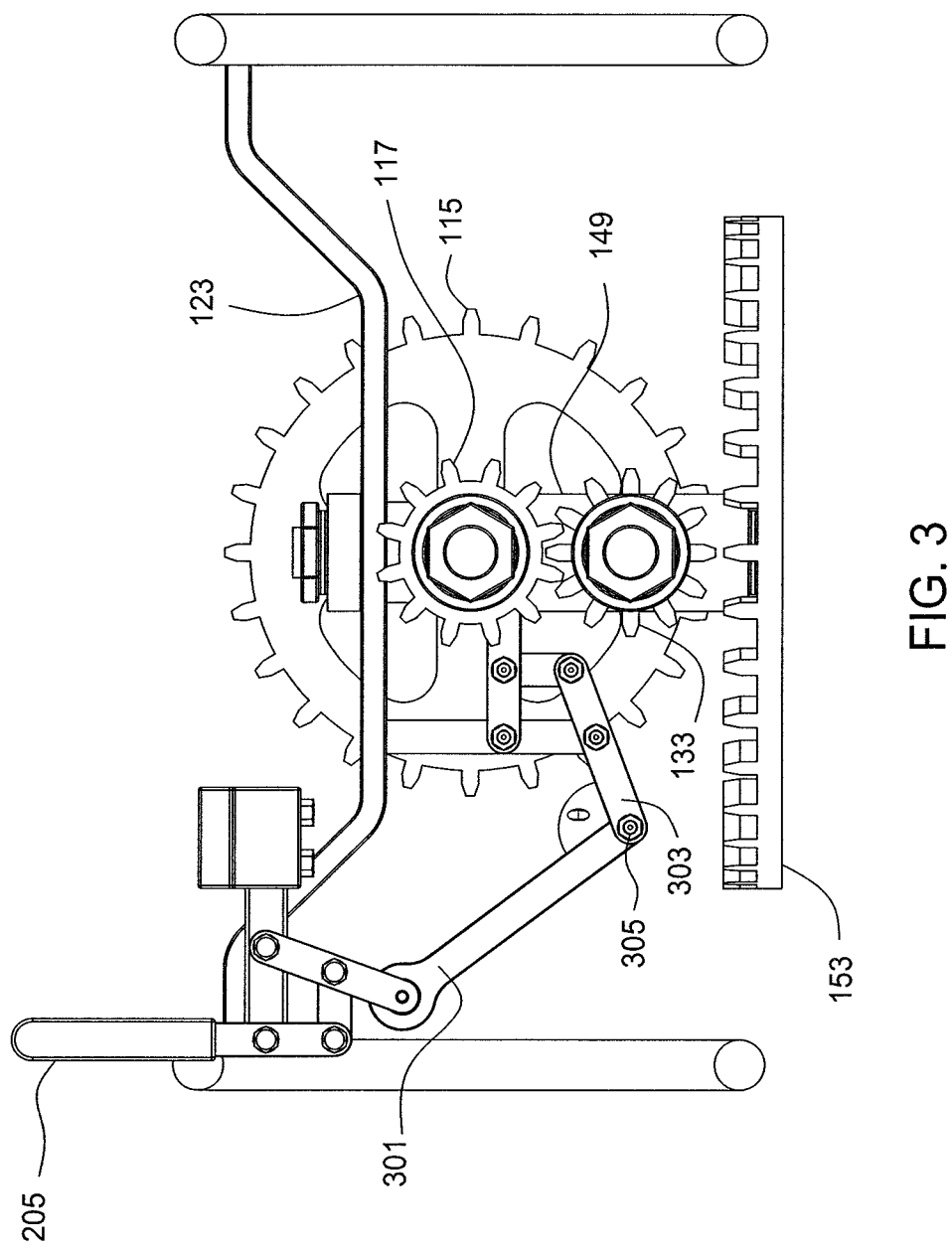
FIG. 3 is a side view of the differential, in which the differential is unlocked.

FIG. 3 is a side view of the differential, in which the differential is unlocked. In one embodiment, the handle 205 is connected to the connector 143 (not illustrated, but would be normal to the page in FIG. 3), which in turn is connected to a first linkage 301 and a second linkage 303. Thus, the first linkage 301 is connected directly to the sun gear lever, while the second linkage is connected directly to the sun gear support 149. The first linkage 301 is connected to the second linkage at a joint 305. The first linkage 301 and the second linkage 303 are moveable relative to each other about the joint 305. When the handle 205 of the sun gear lever is in the vertical position, a first angle $\theta$ is created between the first linkage 301 and the second linkage 303, and the sun gear 153 sits at a first height relative to the first planet gear 115, the second planet gear 117, and the third planet gear 133.

Figure 4:
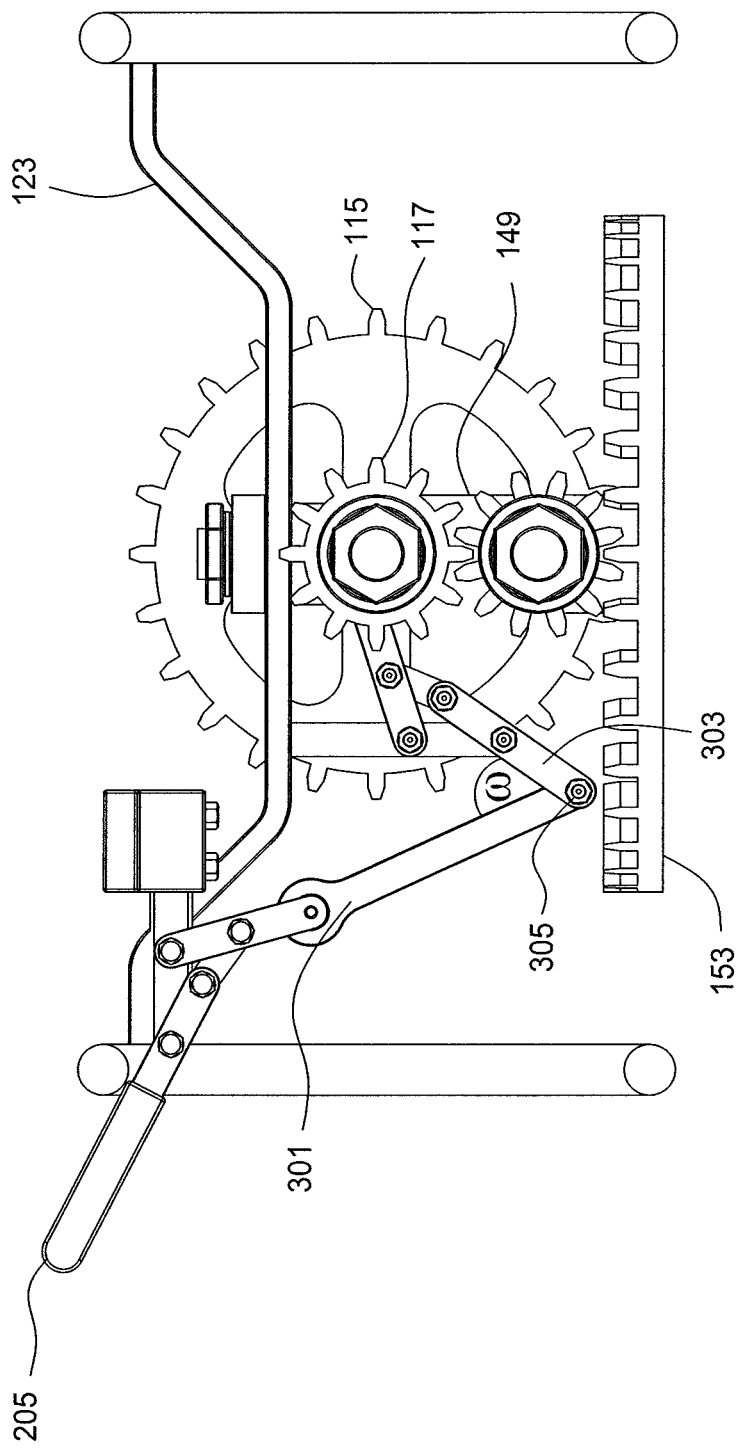
FIG. 4 is a side view of the differential, in which the differential is locked.

FIG. 4 is a side view of the differential, in which the differential is locked. When the handle 205 of the sun gear lever is in the horizontal position, a second angle $\omega$ is created between the first linkage 301 and the second linkage 303. The second angle $\omega$ is smaller in degree than the first angle $\theta$, and the first linkage 301 and the second linkage 303 are collapsed or pushed closer together, which raises the sun gear 153 so that it sits at a second height relative to the first planet gear 115, the second planet gear 117, and the third planet gear 133. The second height is higher than the first height and is sufficient to engage the first planet gear 115, the second planet gear 117, and the third planet gear 133, thereby locking the differential. Thus, the sun gear 153 is moveable in the vertical direction to selectively engage or disengage the first planet gear 115, the second planet gear 117, and the third planet gear 133.

Figure 5:
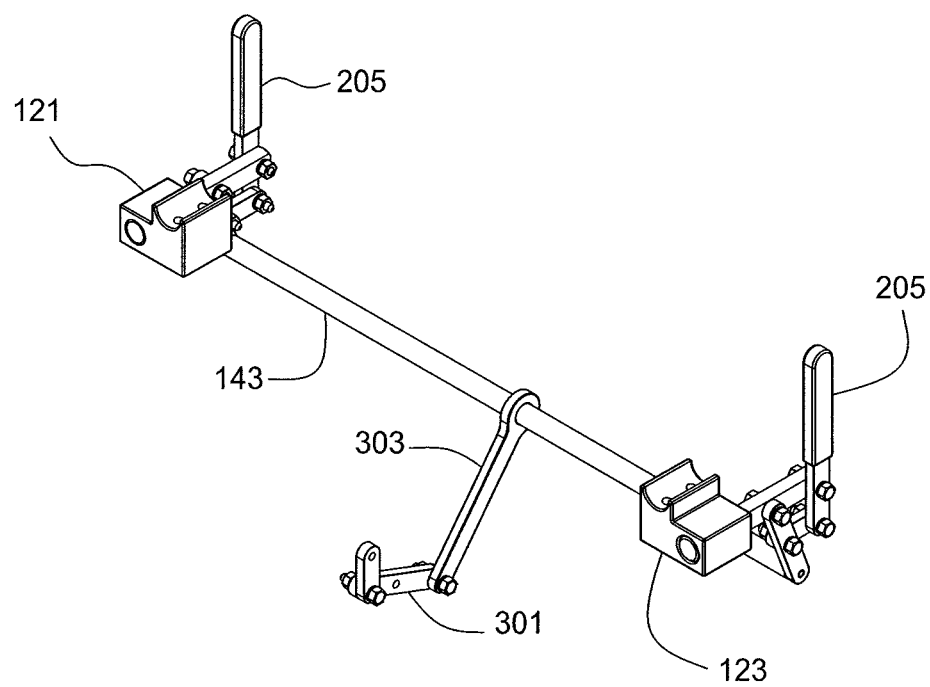
FIG. 5 is an isometric view of the planet gear lever and associated components.

FIG. 5 is an isometric view of the sun gear lever and associated components. As discussed above, the sun gear lever may include more than one handle 205 coupled to the connector 143. In the illustrated example, two handles 205 are coupled to the connector 143 (e.g., via the first frame bracket 121 and the second frame bracket 123). Rotation of the handle 205 about the connector 143 causes the first linkage 301 and the second linkage 303 to be collapsed, as discussed above.

Figure 6:
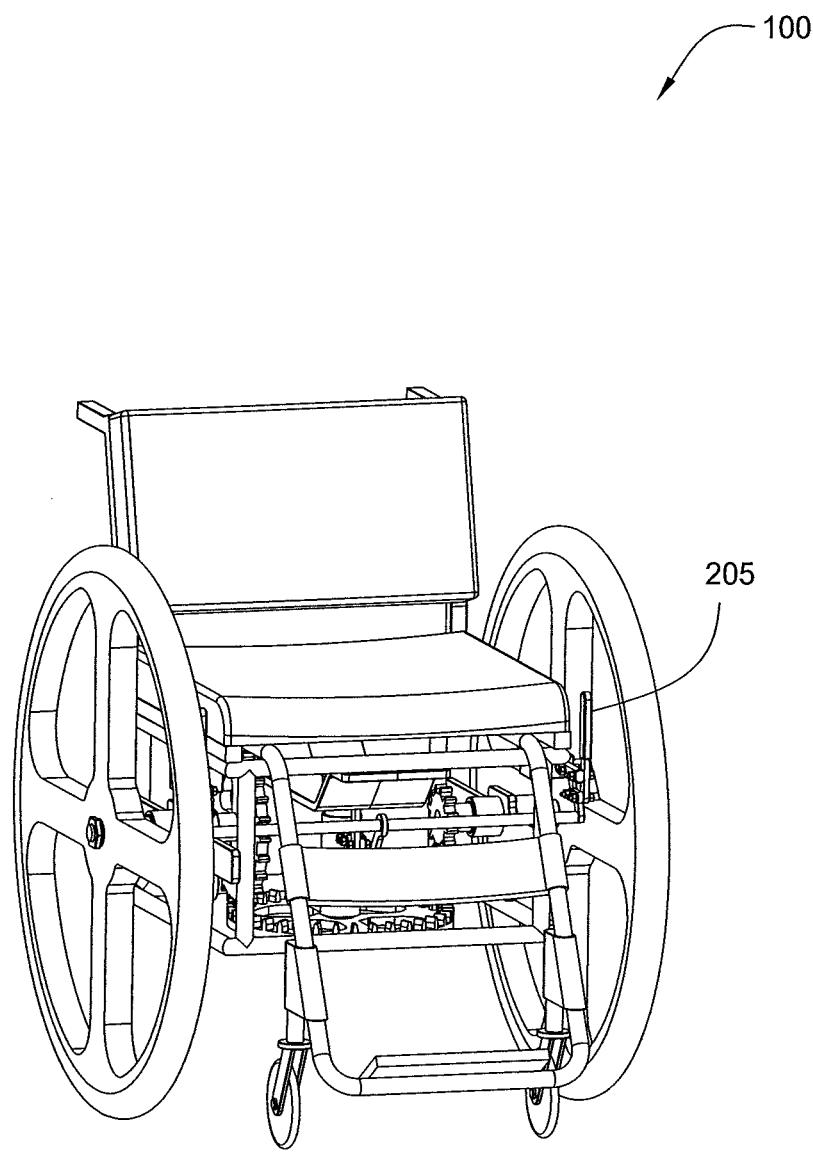
FIG. 6 is an isometric view of the assembled wheelchair, in which the differential is locked.

FIG. 6 is an isometric view of the assembled wheelchair 100, in which the differential is unlocked (as indicated by the vertical position of the handle 205 of the sun gear lever, as discussed above).

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A wheelchair, comprising:
    a seat for supporting an occupant; and
    a frame supporting the seat, the frame comprising:
        a first pair of wheels; and a second pair of wheels connected by a differential for reversibly locking the second pair of wheels such that propulsion of only one of the wheels in the second pair of wheels results in both of wheels in the second pair of wheels moving in an identical direction, wherein the second pair of wheels comprises:
  a first wheel positioned on a first side of the seat; and
  a second wheel positioned on a second side of the seat opposite from the first side,
and wherein the differential comprises:
  a first planet gear connected to the first wheel by a first axle;
  a second planet gear connected to the second wheel by a second axle; and
  a sun gear connected to the frame, wherein the sun gear is moveable in a vertical direction to selectively engage the first planet gear and the second planet gear.

2. The wheelchair of claim 1, wherein the differential further comprises:
  a third planet gear connected to the second wheel by a third axle, and engaging the second planet gear.

3. The wheelchair of claim 1, wherein the sun gear is positioned in a perpendicular manner relative to the first planet gear and the second planet gear.

4. The wheelchair of claim 1, wherein the sun gear is connected to the frame via a lever that is operable to move the sun gear in the vertical direction.

5. The wheelchair of claim 4, wherein the lever includes a handle that allows for manual rotation of the lever.

6. The wheelchair of claim 5, wherein the lever is connected to a support that supports the planet gear via a set of linkages.

7. The wheelchair of claim 6, wherein the set of linkages comprises:
  a first linkage directly connected to the lever; and
  a second linkage directly connected to the support,
  wherein the first linkage and the second linkage are directly connected to each other at a joint.

8. The wheelchair of claim 1, wherein selective engagement of the sun gear with the first planet gear and the second planet gear results in the locking.

9. The wheelchair of claim 1, wherein the identical direction comprises a straight line.

10. A wheelchair, comprising:
  a seat for supporting an occupant; and
  a frame supporting the seat, the frame comprising:
    a pair of front wheels, the pair of front wheels comprising a first front wheel and a second front wheel;
    a pair of rear wheels, the pair of rear wheels comprising a first rear wheel and a second rear wheel; and
    a differential connecting the first rear wheel and the second rear wheel, the differential comprising:
      a first planet gear connected to the first rear wheel by a first axle;
      a second planet gear connected to the second rear wheel by a second axle; and
      a sun gear connected to the frame, wherein the sun gear is moveable in a vertical direction to selectively engage the first planet gear and the second planet gear such that propulsion of only one of the first rear wheel or the second rear wheel results in the pair of rear wheels moving in an identical direction.

11. The wheelchair of claim 10, wherein the first rear wheel is positioned on a first side of the seat, and the second rear wheel is positioned on a second side of the seat opposite from the first side.

12. The wheelchair of claim 10, wherein the differential further comprises:
  a third planet gear connected to the second rear wheel by a third axle, and engaging the second planet gear.

13. The wheelchair of claim 10, wherein the sun gear is positioned in a perpendicular manner relative to the first planet gear and the second planet gear.

14. The wheelchair of claim 10, wherein the sun gear is connected to the frame via a lever that is operable to move the sun gear in the vertical direction.

15. The wheelchair of claim 14, wherein the lever includes a handle that allows for manual rotation of the lever.

16. The wheelchair of claim 15, wherein the lever is connected to a support that supports the sun gear via a set of linkages.

17. The wheelchair of claim 16, wherein the set of linkages comprises:
  a first linkage directly connected to the lever; and
  a second linkage directly connected to the support,
  wherein the first linkage and the second linkage are directly connected to each other at a joint.

18. The wheelchair of claim 10, wherein the identical direction comprises a straight line.

* * * * *